Sept. 18, 1923. P. R. COLLIER 1,468,260
TILTING HEADLIGHT DEVICE FOR AUTOMOBILES AND OTHER VEHICLES
Filed March 28, 1922
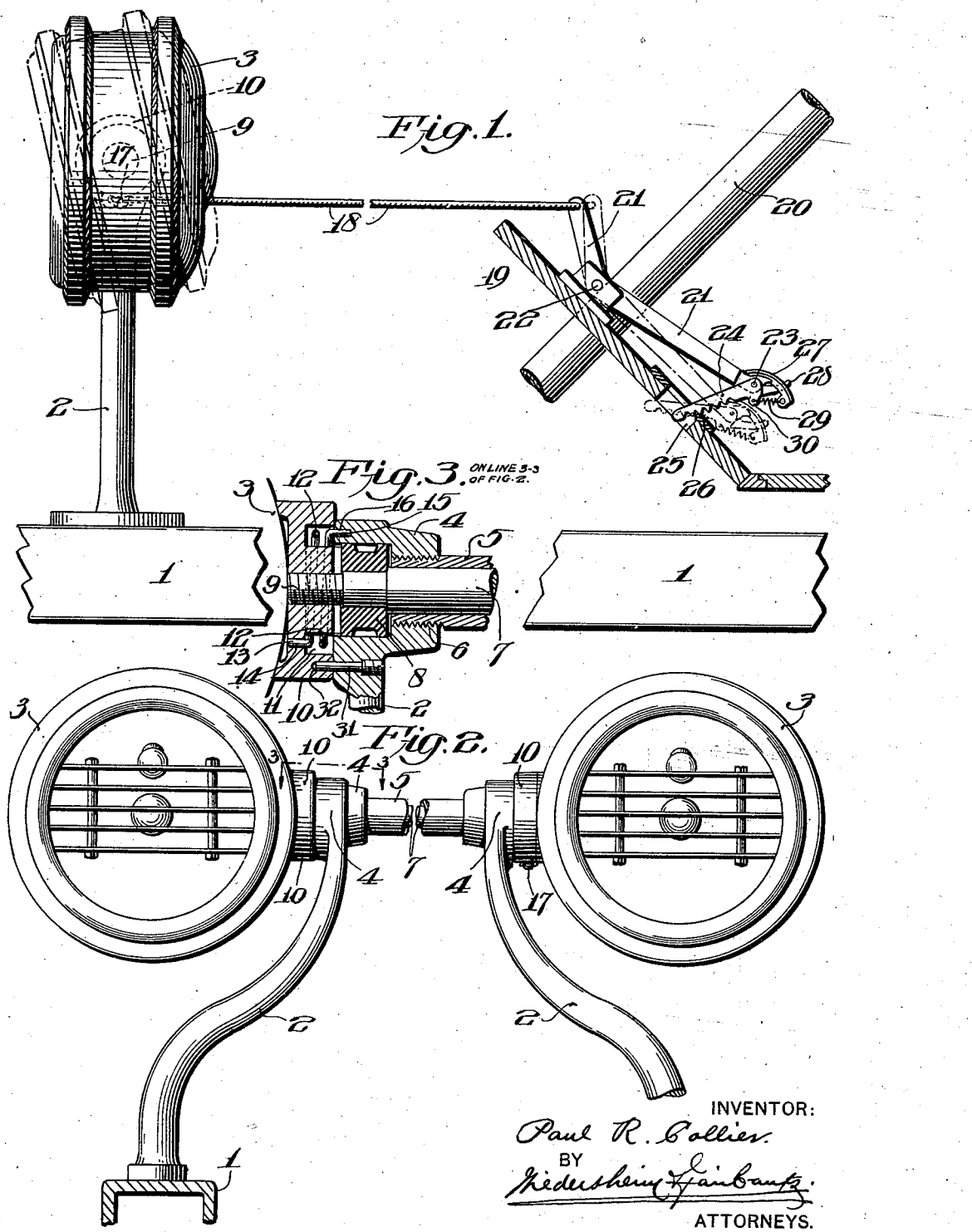

Patented Sept. 18, 1923.

1,468,260

UNITED STATES PATENT OFFICE.

PAUL R. COLLIER, OF PHILADELPHIA, PENNSYLVANIA.

TILTING HEADLIGHT DEVICE FOR AUTOMOBILES AND OTHER VEHICLES.

Application filed March 28, 1922. Serial No. 547,516.

*To all whom it may concern:*

Be it known that I, PAUL R. COLLIER, a citizen of the United States, residing in the city and county of Philadelphia, State of Pennsylvania, have invented a new and useful Tilting Headlight Device for Automobiles and Other Vehicles, of which the following is a specification.

My invention relates to a novel device for tilting headlights of the character used more particularly in automobiles, and comprises novel means controlled by the operator's foot for effecting the desired adjustment, the headlights being automatically returned to normal position by novel tension devices when the foot control mechanism is released.

A further object of my invention is to effect the control of the headlights by a pedal or foot-lever so mounted and connected therewith as to be susceptible of effecting both their proper actuation and their temporary locking in the desired adjusted position, according to requirements.

A further object is to effect control between the foot-operated means and the headlights by novel devices embodying an automatic returning means, which will serve to return both the headlights and the pedal to the normal position which the pedal occupies when the lights are in their normal position.

With the foregoing and other objects in view, my invention comprehends the devices represented in the accompanying drawings and hereinafter described, and claimed.

For the purpose of illustrating my invention, I have shown in the accompanying drawings, a form thereof which is at present preferred by me, since the same will give in practice satisfactory and reliable results. It is to be understood, however, that the various instrumentalities of which my invention consists can be variously arranged and organized and that my invention is not limited to the precise arrangement and organization of these instrumentalities as herein shown and described.

Figure 1 represents a side elevation of an automobile tilting headlight device and its adjuncts embodying my invention, the full lines indicating the normal position thereof and the dotted lines the positions the parts are caused to assume under the operation of the pedal for the deflection of the lights.

Figure 2 represents a front elevation of Figure 1.

Figure 3 represents on an enlarged scale a central section of a portion of the headlight-returning mechanism, the section being taken on line 3—3 of Figure 2.

Similar numerals of reference indicate corresponding parts,

Referring to the drawings, 1 represents a portion of the front frame of any preferred form of automobile or other self propelled vehicle, upon which are erected the headlight-carrying standards 2, upon which are supported the pair of headlights 3, of any conventional type.

The upper end of each standard 2 is formed with a hollow bearing 4 and into the juxtaposed ends of said bearings are threaded as at 6, the ends of the horizontal or transverse tube or sleeve 5, whereby the upper ends of the standards 2 are rigidly and effectively braced. The tube 5 also serves as a container for the shaft 7 rotatably mounted within it, each end of said shaft projecting into a bearing 4, and passing through a roller 8, each terminal of said shaft being threaded as at 9 into the boss or member 10 on the side of a headlight frame and fixedly connected therewith.

As the construction within each bearing 4 is the same, a description of one will suffice for both, reference being had to the left-hand bearing and its adjuncts illustrated in Figure 3.

Each member 10 has the chamber 11 therein, containing a coiled or torsional spring 12, the outer end of which is bent at 13 to engage a seat 14 in the member 10, while the inner end 15 thereof similarly engages the seat 16 formed in the juxtaposed face of a bearing 4.

It is manifest that the shaft 7, the members 10 and headlights 3 are rotatable as a unit, and any rotation imparted to the shaft 7 occasioned by the pedal 21 and its adjuncts as hereinafter described, will effect the rotation or tilting of each headlight against the torsion of the springs 12 to the desired extent, and when said shaft is released, the torsion of the springs will return the headlights into the normal position from which they were first deflected.

In order to effect the rotary or oscillatory movement, or tilting of the headlights, I connect the front end of the connection 18 to the lug 17, which projects from either of the members 10, as the right hand member, seen in Figure 2, and secure the rear end of said connection to the upper member of the pedal or lever 21, which may be of bell crank form and is fulcrumed at 22 to the footboard 19, through which the steering column 20 passes.

The lower end of the pedal has pivoted to it at 23, the inner end of a detent 24, which passes through a slot 25 in the foot board, and whose notches are adapted to engage a locking plate 26 applied to or formed upon the foot-board in proximity to the slot 25.

The lower end 27 of the pedal 21 has projecting through it, or, if desired, lying along side of it, a heel or teat 28 of the detent 24, which is normally held in the position seen in full lines in Figure 1, by a connecting spring 29, which is secured between the inner end 27 of the pedal and the point 30 on the bottom of the detent, whereby the latter locks the pedal in whatever position may be desired, as that represented in full lines in Figure 1, or in dotted lines in said Figure 1, or in any intermediate position.

The operation is as follows:

The parts normally appear as seen in full lines in Figure 1. When it is desired to tilt the head lights, so as to deflect the light rays upon any particular area, the operator depresses the pedal 21, with his foot, thereby exerting a pull on the connector 18, which rotates the members 10, the shaft 7 and the headlights 3 until the latter assume the position seen in dotted lines, the detent 24 locking the parts in the desired position after the removal of the operator's foot. Upon tripping the detent 24, the torsion of the spring or springs 12 will restore the headlights and their adjuncts to the positions seen in full lines, the proper normal of the parts being assured by the engagement of the pin 31, with the slot 32 (see Figure 3).

The outer transverse tube 5 acts effectively to tie the upper ends of the standards 2 rigidly in position and further serves as a container for the rod or shaft 7, which also serves to stiffen the entire structure, and its outer ends are effectively supported in the rollers 8. The pedal 21 and its adjuncts may be located in any desired position, so as to be readily accessible to the desired foot of the operator, and not interfere with the other elements of the operative mechanism as the accelerator or the starter and if desired the connection 18 may be manually operated instead of foot operated, but I prefer the construction shown, since in practice I have found it to give great satisfaction when installed substantially as shown.

Having thus described my invention what I claim as new and desire to secure by Letters Patent is:—

1. In a tilting headlight device, a pair of headlights, a pair of standards, a transverse tube common to said standards, bearings in said standards, a shaft passing through said tube and bearings and connected to said headlights, means for rotating said shaft and headlights to tilt the latter, and torsional devices for restoring said headlight and shaft to normal position.

2. In a tilting headlight device, a pair of standards, bearings in the upper portions thereof, a pair of headlights having bosses on the inner portions thereof, a tube common to said bearings, rollers contained in said bearings, a shaft contained in said tube, and having its outer ends passing through said rollers and engaging said bosses, and torsional devices common to said bosses and bearings for automatically restoring said headlights to normal position.

3. In a tilting headlight device, a pair of standards, bearings in the upper portions thereof, a pair of headlights having bosses on the inner portions thereof, a tube common to said bearings, rollers contained in said bearings, a shaft contained in said tube, and having its outer ends passing through said rollers and engaging said bosses, and torsional devices common to said bosses and bearings for automatically restoring said headlights to normal position, in combination with foot actuated means for rotating said shaft and tilting said headlights.

4. In a tilting headlight device, a pair of standards, bearings in the upper portions thereof, a pair of headlights having bosses on the inner portions thereof, a tube common to said bearings, rollers contained in said beaings, a shaft contained in said tube, and having its outer ends passing through said rollers and engaging said bosses, and torsional devices common to said bosses and bearings for automatically restoring said headlights to normal position, in combination with foot actuated devices for rotating said shaft and tilting said headlights, and means for locking said foot actuated devices in different positions.

PAUL R. COLLIER.

Witnesses:
C. D. McVay,
E. Leah Farley.